United States Patent
Hanawa

(10) Patent No.: US 8,284,449 B2
(45) Date of Patent: Oct. 9, 2012

(54) IMAGE FORMING APPARATUS AND CONTROL METHOD THEREOF

(75) Inventor: Keiko Hanawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 832 days.

(21) Appl. No.: 12/433,025

(22) Filed: Apr. 30, 2009

(65) Prior Publication Data

US 2009/0273799 A1   Nov. 5, 2009

(30) Foreign Application Priority Data

May 2, 2008   (JP) .................. 2008-120635

(51) Int. Cl.
*G06F 3/12*   (2006.01)

(52) U.S. Cl. ..... 358/1.9; 358/1.15; 358/474; 707/104.1; 707/E17.01

(58) Field of Classification Search .................. 358/1.19, 358/1.15, 474; 707/104.1, E17.01
See application file for complete search history.

(56) References Cited

U.S. PATENT DOCUMENTS

2005/0102327 A1   5/2005   Manki et al. .................. 707/200
2007/0005561 A1*  1/2007   Sakura et al. ..................... 707/1

FOREIGN PATENT DOCUMENTS

JP   2005-166008   6/2005

* cited by examiner

*Primary Examiner* — Marivelisse Santiago Cordero
*Assistant Examiner* — Moustapha Diaby
(74) *Attorney, Agent, or Firm* — Fitzpatrick, Cella, Harper & Scinto

(57) ABSTRACT

An image forming apparatus is provided which associates specific folders, which are set for specific setting items, with a specific file, and performs operations on the specific file according to the settings of the specific folders. The image forming apparatus includes an associating unit that associates a file having setting on its own file with one of the specific folders, and a setting contents substituting unit that substitutes setting contents of the specific folder with setting contents of the own file.

3 Claims, 19 Drawing Sheets

| ITEM | SETTING |
|---|---|
| PRINT QUALITY | FINE |
| DENSITY | 0 |
| SHEET FEED PORT | CASSETTE |
| PRINT SHEET | PLAIN SHEET |
| PRINT SIZE | A4 |
| MAGNIFICATION | 100% |
| NUMBER OF SHEETS | 1 |

TH2

COMMON ITEMS:
PRINT QUALITY
PRINT SHEET
PRINT SIZE
NUMBER OF SHEETS

PRINT SETTING TABLE T11 OF DPOF OF FILE F4

| ITEM | SETTING |
|---|---|
| PRINT QUALITY | FAST |
| PRINT SHEET | GLOSSY SHEET |
| PRINT SIZE | KG |
| NUMBER OF SHEETS | 5 |

| ITEM | SETTING |
|---|---|
| PRINT QUALITY | FAST |
| DENSITY | 0 |
| SHEET FEED PORT | CASSETTE |
| PRINT SHEET | GLOSSY SHEET |
| PRINT SIZE | KG |
| MAGNIFICATION | 100% |
| NUMBER OF SHEETS | 5 |

TH2'

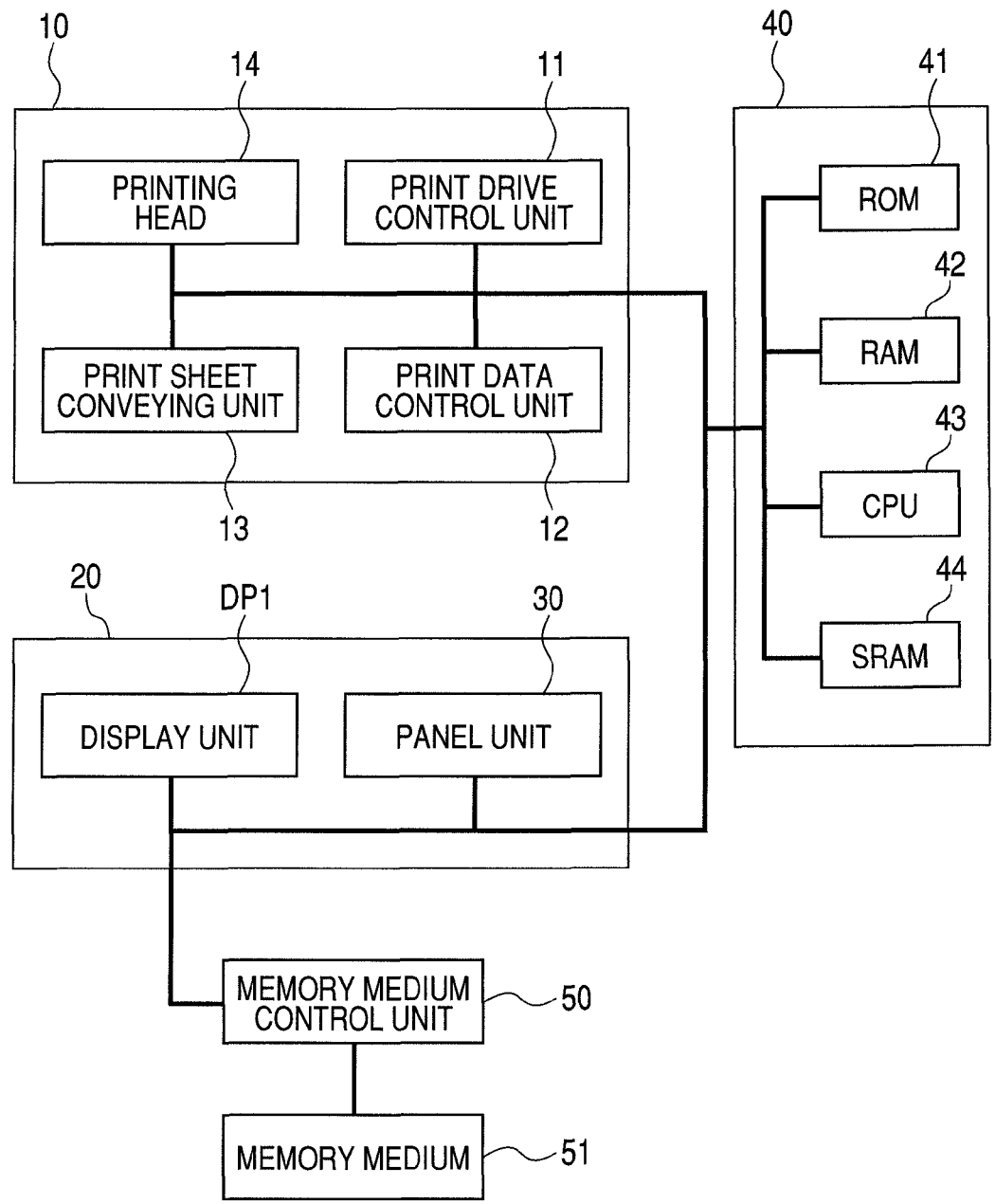

FIG. 2A

| PRINT QUALITY | FAST |
|---|---|
| DENSITY | 0 |
| SHEET FEED PORT | ASF |
| PRINT SHEET | HIGHT QUALITY |
| PRINT SIZE | POST CARD |
| MAGNIFICATION | AUTO-FIT |
| NUMBER OF SHEETS | 2 |

FIG. 2B

| PRINT QUALITY | FINE |
|---|---|
| DENSITY | 0 |
| SHEET FEED PORT | CASSETTE |
| PRINT SHEET | PLAIN SHEET |
| PRINT SIZE | A4 |
| MAGNIFICATION | 100% |
| NUMBER OF SHEETS | 1 |

FIG. 2C

| PRINT QUALITY | FAST |
|---|---|
| DENSITY | +3 |
| SHEET FEED PORT | CASSETTE |
| PRINT SHEET | GLOSSY SHEET |
| PRINT SIZE | KG |
| MAGNIFICATION | 100% |
| NUMBER OF SHEETS | 10 |

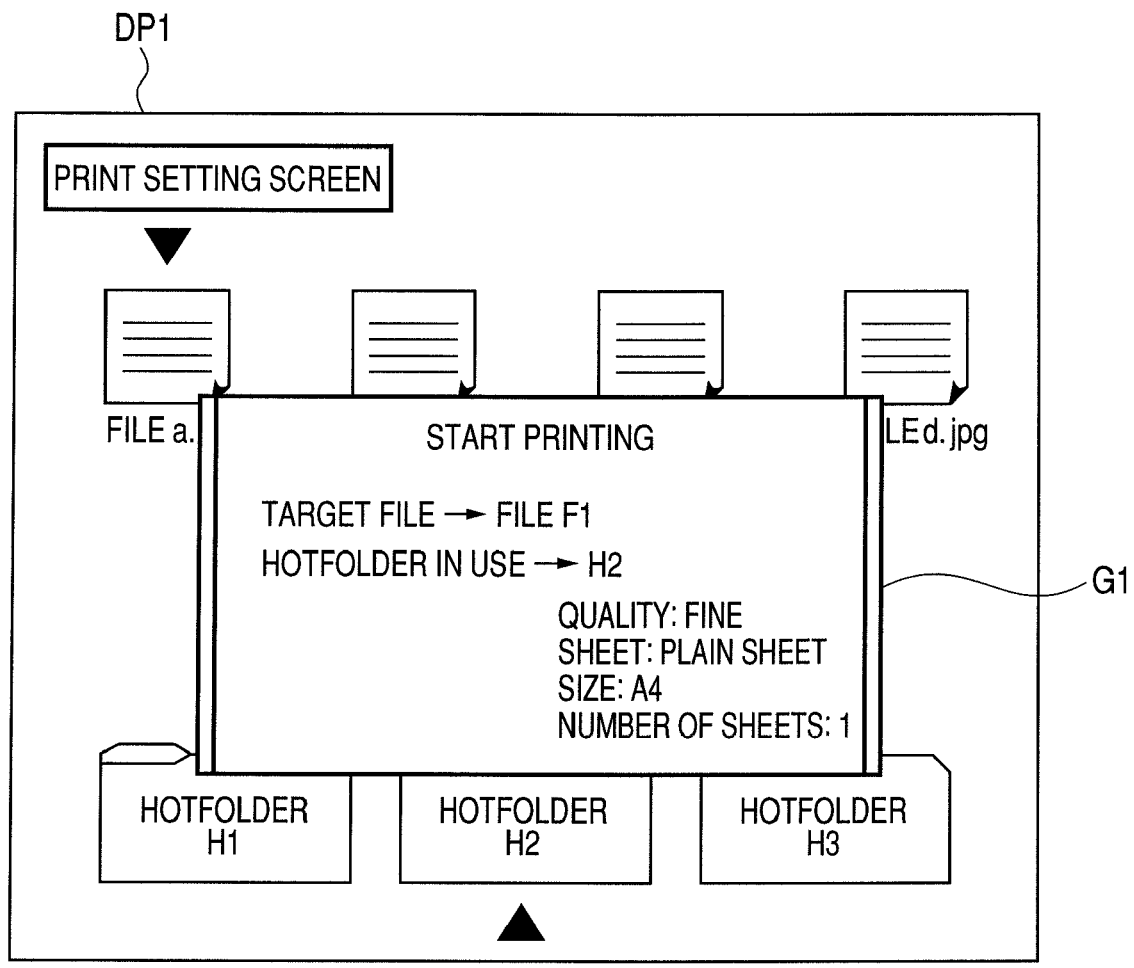

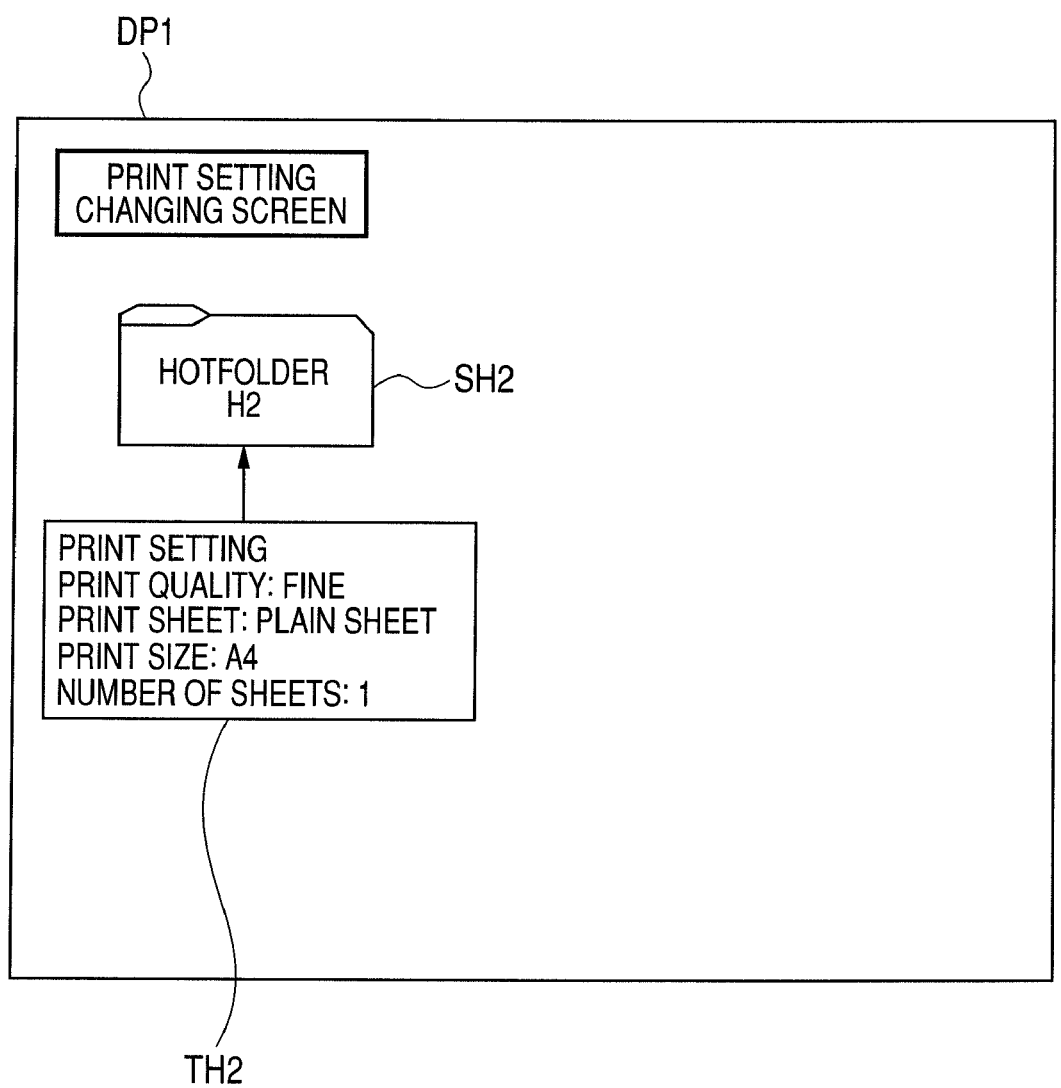

FIG. 7

| ITEM | SETTING |
|---|---|
| PRINT QUALITY | FINE |
| DENSITY | 0 |
| SHEET FEED PORT | CASSETTE |
| PRINT SHEET | PLAIN SHEET |
| PRINT SIZE | A4 |
| MAGNIFICATION | 100% |
| NUMBER OF SHEETS | 1 |

TH2

COMMON ITEMS:
 PRINT QUALITY
 PRINT SHEET
 PRINT SIZE
 NUMBER OF SHEETS

PRINT SETTING TABLE
T11 OF DPOF OF FILE F4

| ITEM | SETTING |
|---|---|
| PRINT QUALITY | FAST |
| PRINT SHEET | GLOSSY SHEET |
| PRINT SIZE | KG |
| NUMBER OF SHEETS | 5 |

| ITEM | SETTING |
|---|---|
| PRINT QUALITY | FAST |
| DENSITY | 0 |
| SHEET FEED PORT | CASSETTE |
| PRINT SHEET | GLOSSY SHEET |
| PRINT SIZE | KG |
| MAGNIFICATION | 100% |
| NUMBER OF SHEETS | 5 |

TH2'

| PRINT ITEM | STATUS | HOTFOLDER PREFERENTIAL? |
|---|---|---|
| PRINT QUALITY | FINE | × |
| DENSITY | 0 | ○ |
| SHEET FEED EXIT | CASSETTE | ○ |
| PRINT SHEET | PLAIN SHEET | ○ |
| PRINT SIZE | A4 | ○ |
| MAGNIFICATION | 100% | ○ |

FIG. 11

| PRINT ITEM | STATUS | HOTFOLDER PREFERENTIAL? | |
|---|---|---|---|
| PRINT QUALITY | FINE | × | |
| DENSITY | 0 | ○ | |
| SHEET FEED EXIT | CASSETTE | ○ | TH2 |
| PRINT SHEET | PLAIN SHEET | ○ | |
| PRINT SIZE | A4 | ○ | |
| MAGNIFICATION | 100% | ○ | |

PREFERENTIAL ITEM OF FILE: PRINT QUALITY

PRINT SETTING ITEMS OF DPOF OF FILE

| ITEM | SETTING |
|---|---|
| PRINT QUALITY | FAST |
| PRINT SHEET | HIGH QUALITY SHEET |
| PRINT SIZE | L |
| NUMBER OF SHEETS | 3 |

| PRINT ITEM | STATUS | HOTFOLDER PREFERENTIAL? | |
|---|---|---|---|
| PRINT QUALITY | FAST | × | |
| DENSITY | 0 | ○ | |
| SHEET FEED EXIT | CASSETTE | ○ | TH2' |
| PRINT SHEET | PLAIN SHEET | ○ | |
| PRINT SIZE | A4 | ○ | |
| MAGNIFICATION | 100% | ○ | |

IMAGE FORMING APPARATUS AND CONTROL METHOD THEREOF

BACKGROUND OF THE INVENTION

1. Field of the Invention

The present invention relates to a device control technique for performing output operations to a device in response to user's requests.

2. Description of the Related Art

DPOF is known as a method for simplifying a process of changing setting of a printing device during execution of printing. DPOF is an acronym for Digital Print Order Format. The DPOF is a file format standardized so as to store autoprint information and digital photo image files (hereinafter, referred to as "image files") in demountable memory media (removable memory media) mounted in a card slot or the like and to utilize the memory media when printing the image files. The DPOF file describes information necessary for printing a specific image file stored in the removable memory medium.

Users can configure print settings of image files in advance by using the DPOF file. Therefore, users need not configure the print setting whenever one file is printed. Since the image files can be configured to have different settings, respectively, users can perform printing without changing the print settings of a printing device for each of the image files.

On the other hand, a hot folder is known as means for simplifying a process of changing setting of a printing device. In a case where specific folders which are set for specific setting items are associated with specific files and operations are performed on the specific files according to the settings of the specific folders, the hot folders are the specific folders.

That is, users can configure a hot folder with contents of print setting in advance, and when a file to be printed is dropped onto the hot folder, the file is automatically printed according to the setting of the hot folder.

Therefore, users can preserve a favorite print setting as a hot folder. Moreover, by providing a plurality of hot folders and dropping files to be printed on hot folders, in which desired print settings are designated, among the plurality of hot folders, users can manage the settings for each file. The operations implemented by the hot folders are not limited to printing but the hot folders are generally used, for example, for configuring settings of e-mail and fax transmissions.

Presently, configuring how files dropped onto hot folders will be processed require special operations of users or service men, and an invention that enables easy configuration is proposed (for example, Japanese Patent Application Laid-Open No. 2005-166008, corresponding to U.S. Patent Application Publication No. 2005/0102327).

In the past, users had to configure the settings of a hot folder for each setting item. Moreover, when it was desired to have different print settings for different files to perform printing using the hot folder, users had to provide a plurality of hot folders or change the settings of the hot folder whenever the files are printed.

On the other hand, when it is desired to print a large number of images with the same settings by using the DPOF file, users have to repeat the same DPOF setting operations on the entire image files.

Next, the inconvenience of the conventional examples will be described in detail.

The printing device has many print setting items. The print setting items include print quality (such as fine or fast), print sheet type, and print sheet size. Printing with the DPOF files or the hot folders requires having all of these settings being configured in advance.

For instance, a case will be considered in which a plurality of sheets are printed with settings wherein among seven setting items, five setting items have the same contents and the remaining two setting items have different contents. When such printing is executed by the use of DPOF, the different two setting items need to be configured for the entire image files to be printed. When such printing is executed by the use of hot folders, the followings are required. Users may need to prepare a plurality of hot folders having the same contents for five setting items but having different contents for two setting items. Alternatively, users may need to change the contents of the settings of the hot folder regarding only the two setting items whenever printing is performed.

As described above, in a case where among a plurality of setting items, most setting items have the same contents and only the remaining setting items have different contents, configuring the setting items with DPOF increases the number of operations to be performed.

On the other hand, in a case where among a plurality of setting items, only a small number of setting items have different contents, configuring the setting items with hot folders may produce a plurality of folders having the same settings. Therefore, the folder management is complicated. The invention described in Japanese Patent Application Laid-Open No. 2005-166008 decreases the number of operations by providing a special file for setting hot folders. However, since this setting file does not have a general format, a device having a special creation program is required for creating the file.

SUMMARY OF THE INVENTION

An object of the present invention is to provide an image forming apparatus capable of decreasing the number of configuring operations required when configuring a plurality of setting items so that most setting items have the same contents and only remaining setting items have different contents, and capable of realizing easy folder management.

The present invention is directed to provide an image forming apparatus that associates specific folders, which are set for specific setting items, with a specific file, and performs operations on the specific file according to the settings of the specific folders. The image forming apparatus includes an associating unit that associates a file having setting on its own file with one of the specific folders, and a setting contents substituting unit that substitutes setting contents of the specific folder with setting contents of the own file.

With the present invention, the number of configuring operations required when configuring a plurality of setting item so that most setting items have the same contents and only remaining setting items have different contents can be decreased and easy folder management can be provided.

Further features of the present invention will become apparent from the following description of exemplary embodiments with reference to the attached drawings.

BRIEF DESCRIPTION OF THE DRAWINGS

FIG. 1 is a block diagram of an image forming apparatus 100 according to a first embodiment of the present invention.

FIGS. 2A, 2B and 2C illustrate contents of print setting tables TH1, TH2, and TH3.

FIG. 4C illustrates a print execution confirmation screen G1 displayed when printing is being executed.

FIG. 6A illustrates a screen for displaying only a folder selected from a list of hot folders being displayed on a display unit DP1 to change the settings of the selected hot folder.

FIG. 7 schematically illustrates the operation of overwriting setting information of a hot folder.

FIG. 11 schematically illustrates a new print setting table TH2' produced from a print setting table TH2 assigned to a hot folder H2 according to the second embodiment and the print setting table TH2 based on the print settings of DPOF of a file.

DESCRIPTION OF THE EMBODIMENTS

Figure 3:
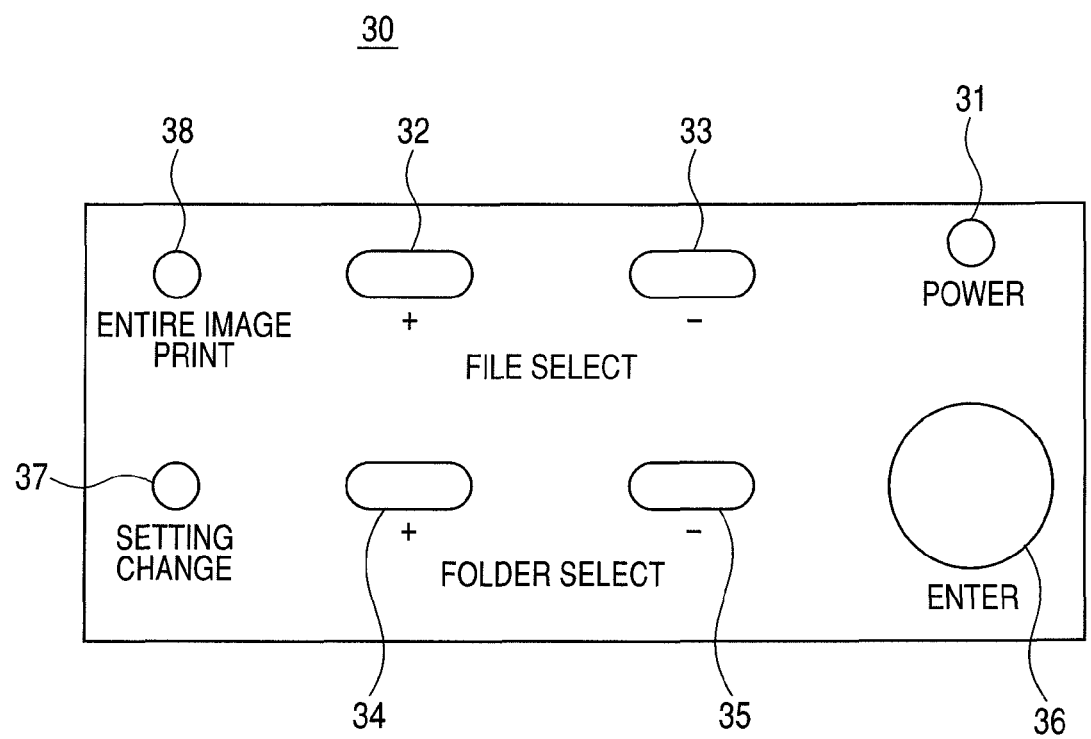
FIG. 3 illustrates an example of a panel unit 30 used in the first embodiment.

Preferred embodiments of the present invention will now be described in detail in accordance with the accompanying drawings.

First Embodiment

<Hardware Configuration>

An embodiment of the present invention relates to an image forming apparatus that includes a function of reading image files from a memory medium 51, a user interface (UI) portion that displays image files stored in the memory medium 51, and hot folders used when designating image files to be printed.

In a case where specific folders which are set for specific setting items are associated with specific files and operations are performed on the specific files according to the settings of the specific folders, the hot folders are the specific folders.

That is, the hot folders are generally used when printing files, and the entire files dropped onto a hot folder in which the settings of "print size", "print sheet" and the like are configured in advance are printed with the same print settings. Therefore, hot folders are convenient when performing the same printing operations on a plurality of image files.

FIG. 1 is a block diagram illustrating an image forming apparatus 100 according to a first embodiment of the present invention.

The image forming apparatus 100 is an example of an information device that associates specific folders, which are set for specific setting items, with a specific file, and performs operations on the specific file according to the settings of the specific folders.

The image forming apparatus 100 includes a printing unit 10, a displaying unit 20, a control unit 40, and a memory medium control unit 50.

The printing unit 10 is configured by an ink jet printer, for example. Ink jet printers form images by ejecting ink supplied from non-illustrated ink cartridges onto print sheet.

The displaying unit 20 includes a display unit DP1 and a panel unit 30.

The display unit DP1 visually assists user's operations. For example, the display unit DP1 displays a print setting screen to prompt users to input a subsequent operation.

The panel unit 30 is a portion through which users issue instructions to the image forming apparatus 100 and is an operation panel configured by keys and a touch panel, for example.

The control unit 40 controls the whole image forming apparatus 100 and includes a ROM 41, a RAM 42, a CPU 43, and an SRAM 44.

The memory medium control unit 50 is a portion that connects a removable memory medium 51 such as Compact-Flash (the registered trademark) to the image forming apparatus 100. If image data is present in the connected memory medium 51, the memory medium control unit 50 recognizes the image data and informs the control unit 40 of the image data. After the connection is recognized, the data stored in the memory medium 51 can be read out and transmitted according to the commands of the control unit 40.

The ROM 41 is a nonvolatile memory in which a control program of the image forming apparatus 100 is stored.

The CPU 43 executes the control program stored in the ROM 41 so as to function as e.g. a printer control unit. Besides, the ROM 41 stores a program for execution of various processes and a program related to reading of a DPOF file or analysis for executing printing.

The SRAM 44 is a rewritable and nonvolatile memory and preserves information such as settings of hot folders that must be preserved even when the main body of the printing device is turned off.

<Operation of Hot Folder>

Typical hot folders are folders that when files to be printed and hot folders are designated, control the files to be printed according to the print settings which are preliminarily defined as registration information associated with the hot folders.

In the first embodiment, the hot folder is assumed to operate in the following manner in the image forming apparatus 100.

The print settings associated with the hot folders are constantly preserved in the SRAM 44. When a user powers on the printing device, the CPU 43 reads print setting information of a hot folder from the SRAM 44 to be stored in the RAM 42. By doing so, even when the power is turned off, the print settings of the hot folder can be preserved and the users can rewrite the print settings. The print setting items of the hot folders are stored in print setting tables TH1, TH2, and TH3 illustrated in FIGS. 2A to 2C.

FIGS. 2A to 2C illustrates the contents of print setting tables TH1, TH2, and TH3 of hot folders H1, H2, and H3, respectively.

FIG. 3 illustrates an example of the panel unit 30 used in the first embodiment.

The panel unit 30 includes power key 31, file select keys 32 and 33, folder select keys 34 and 35, Enter key 36, setting change key 37, and entire image print key 38.

The power key 31 is a key that switches On and Off of power supply to the image forming apparatus 100.

The file select keys 32 and 33 are keys that move a cursor C2 used for designating a file to be printed in vertical and horizontal directions. The movement direction of the cursor C2 is determined by the screen displayed on the display unit DP1, and the directions where the cursor C2 moves in response to depression of the file select keys 32 and 33 are opposite to each other.

The folder select keys 34 and 35 are keys that move a cursor C1 used for designating a hot folder to be used. The movement direction of the cursor C1 is determined by the screen displayed on the display unit DP1, and the directions where the cursor C1 moves in response to the depression of the folder select keys 34 and 35 are opposite to each other.

The Enter key 36 is a key used when determining a selection. The setting change key 37 is a key used when changing the settings of a folder. The entire image print key 38 is a key instructing to print the entire images stored in the memory medium 51.

A print operation which is performed by the use of hot folders will be described.

Figure 5A:
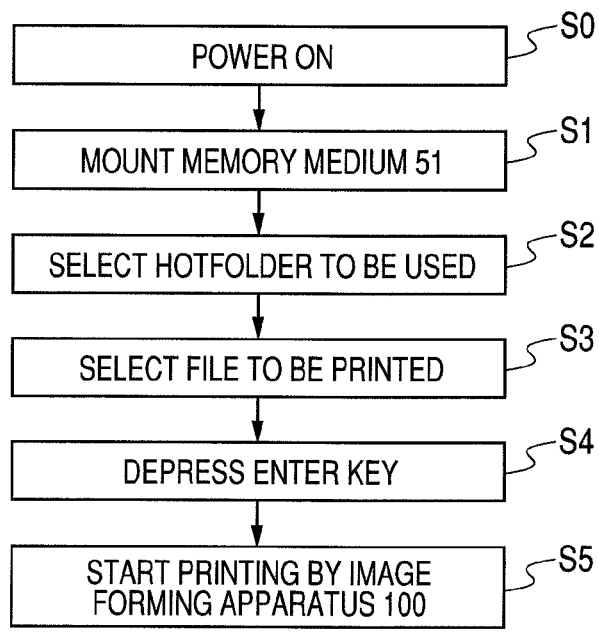
FIG. 5A is a flowchart illustrating the operation of a user when executing printing according to the first embodiment.
Figure 5B:
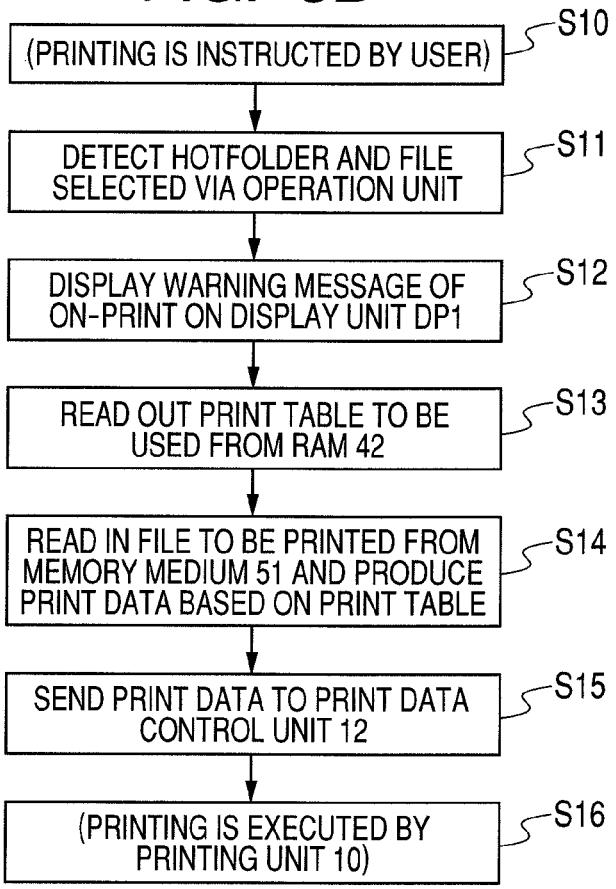
FIG. 5B is a flowchart illustrating the operation of a CPU 43 when executing printing.

FIG. 5A is a flowchart illustrating the operation (manipulation) of a user when executing printing according to the first embodiment, and FIG. 5B is a flowchart illustrating the operation of the CPU 43 when executing printing.

When a user powers on the image forming apparatus 100 at step S0 of FIG. 5A, the CPU 43 reads available hot folders and print settings thereof from the print setting tables TH1, TH2, and TH3 of hot folders, written in the RAM 42. The read hot folders and print settings are displayed on the display unit DP1.

Figure 4A:
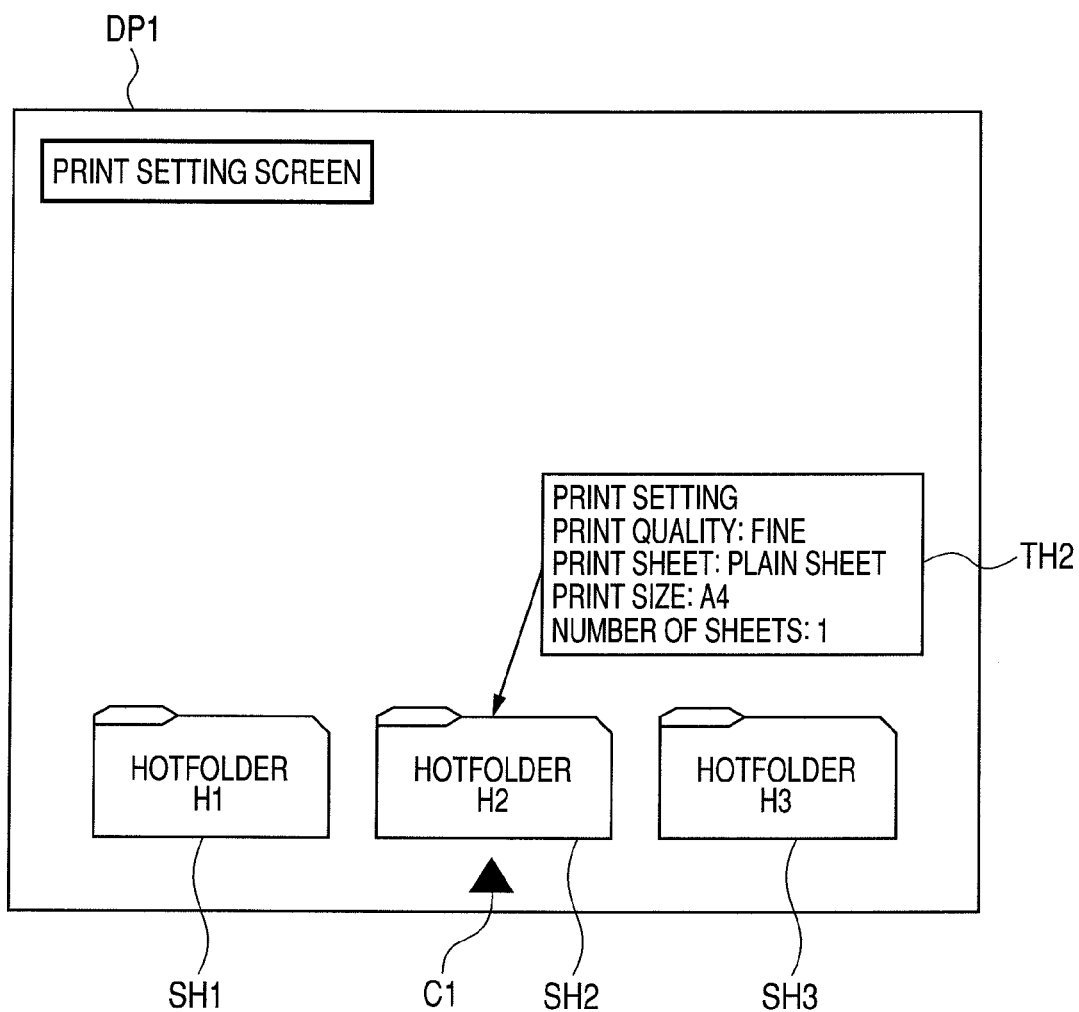
FIG. 4A illustrates a display example of a standby screen according to the first embodiment.

FIG. 4A illustrates a display example of a standby screen when the memory medium 51 is not connected, according to the first embodiment.

Preferably, a plurality of available hot folders H1, H2, and H3 are prepared in advance in a state of having the memory medium 51 being connected thereto, and it is preferable that a part or an entirety of a list thereof is displayable. In the display example illustrated in FIG. 4A, three hot folders H1, H2, and H3 are prepared and configured in advance.

In FIG. 4A, the hot folders H1, H2, and H3 are illustrated as symbols SH1, SH2, and SH3, respectively. The folder select cursor C1 is a cursor for designating a hot folder to be used for printing. When a hot folder H2 is selected by the folder select cursor C1, the print setting table TH2 which is the print setting information of the hot folder H2 is displayed.

After confirming the displayed contents, the user connects the memory medium 51 such as CompactFlash (the registered trademark), in which image files to be printed are stored, to the memory medium control unit 50 (S1).

Upon detecting the connection, the memory medium control unit 50 searches for image files in the memory medium 51 and informs the CPU 43 of the search results. Then, the CPU 43 creates a list of the images in the memory medium 51 from the search results and stores the list in the RAM 42.

The CPU 43 displays information on printable image files produced from the list information of the images stored in the RAM 42 on the display unit DP1 of the displaying unit 20. At this time, the list of hot folders is also displayed.

Figure 4B:
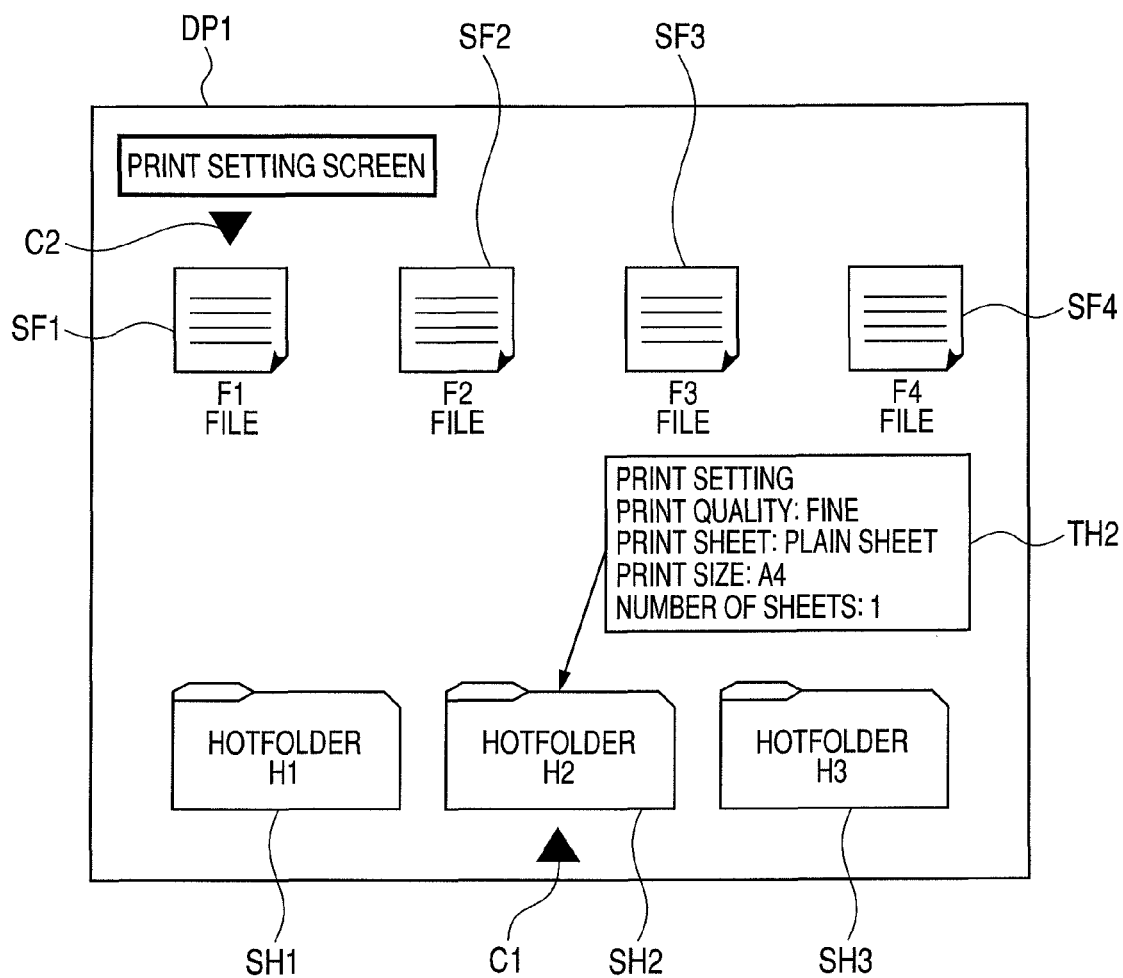
FIG. 4B illustrates a display example of a list of hot folders.

FIG. 4B illustrates a display example of the list of hot folders.

FIG. 4B illustrates an example of a standby screen displayed on the display unit DP1 on which the list of hot folders H1, H2, and H3, available in a state of having the memory medium 51 being connected thereto, and the print settings thereof are displayed.

In FIG. 4B, symbols SF1 to SF4 of printable files F1 to F4 are also illustrated. In this display example, the printable files are represented by the symbols. When creating a list of image files, thumbnail information of the printable files may be acquired so that the thumbnails of the printable files are displayed in lieu of the symbols SF1 to SF4.

The file select cursor C2 is a cursor for selecting a file, and users select a file to be printed by the use of the file select cursor C2.

The user operates the panel unit 30 to move the folder select cursor C1 to a position at which the symbol SH2 of the hot folder H2 is displayed (S2). The user moves the file select cursor C2 to a position at which the symbol SF1 of the file F1 is displayed (S3) and depresses the Enter key 36 (S4). In this way, the instructions for dropping the file F1 onto the hot folder H2 are implemented.

In the first embodiment, files and folders are selected in the above-described manner. Besides, the folder select cursor C1 and the file select cursor C2 may not be provided separately, and folders may be selected after the files are selected. Moreover, the files and folders may be selected by using a device such as a mouse provided to the panel unit 30 to e.g. drag and drop a symbol of a file onto a symbol of a folder.

In response to depression of the Enter key 36, printing is performed by the image forming apparatus 100 (S5 and S10).

Upon detecting depression of the Enter key 36 after the files and folders are selected, the CPU 43 stores the hot folder and file selected by the user in the RAM 42 (S11). Moreover, a printing confirmation screen G1 is displayed on the display unit DP1 (S12).

FIG. 4C illustrates the printing confirmation screen G1 displayed when printing is being executed.

After the printing confirmation screen G1 is displayed, printing is performed on the file F1.

The CPU 43 reads the file F1 which is the image file selected by the user, from the memory medium 51 via the memory medium control unit 50. Similarly, the print settings of the hot folder H2 selected by the user are read from the RAM 42 (S13), and print data of the file F1 is created based on the read print settings (S14) and temporarily stored in the print data control unit 12 (S15).

Then, the print drive control unit 11 determines an ink ejection position based on the print data stored in the print data control unit 12, and a print sheet conveying unit 13 conveys the print sheet based on the determined position. Then, the print drive control unit 11 drives a printing head 14 which is a component for ejecting ink. In this way, images are formed on the print sheet (S16).

The procedure of a printing operation using the hot folder has been described.

Next, the procedure of configuring the print settings of the hot folder by the use of a DPOF file will be described.

Figure 6B:
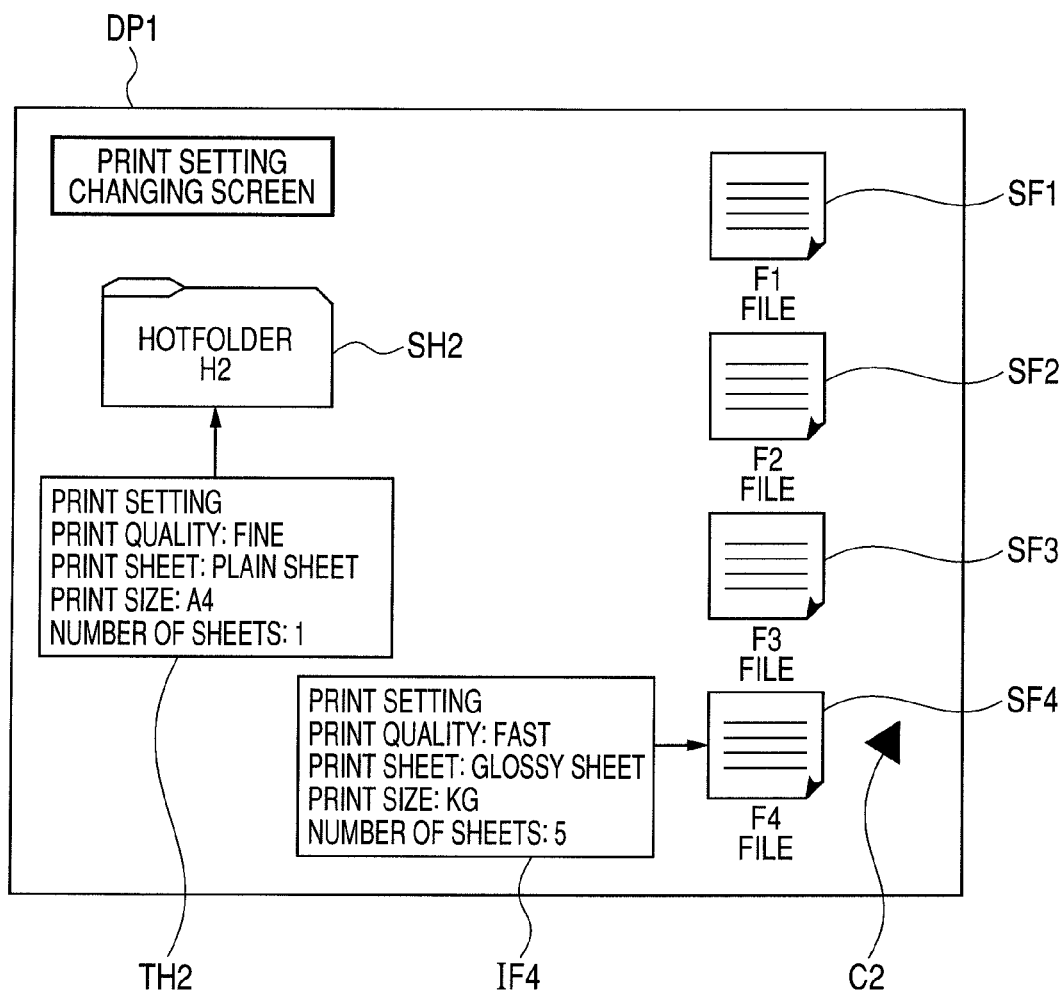
FIG. 6B illustrates an example of a screen for changing the settings of a hot folder.
Figure 6C:
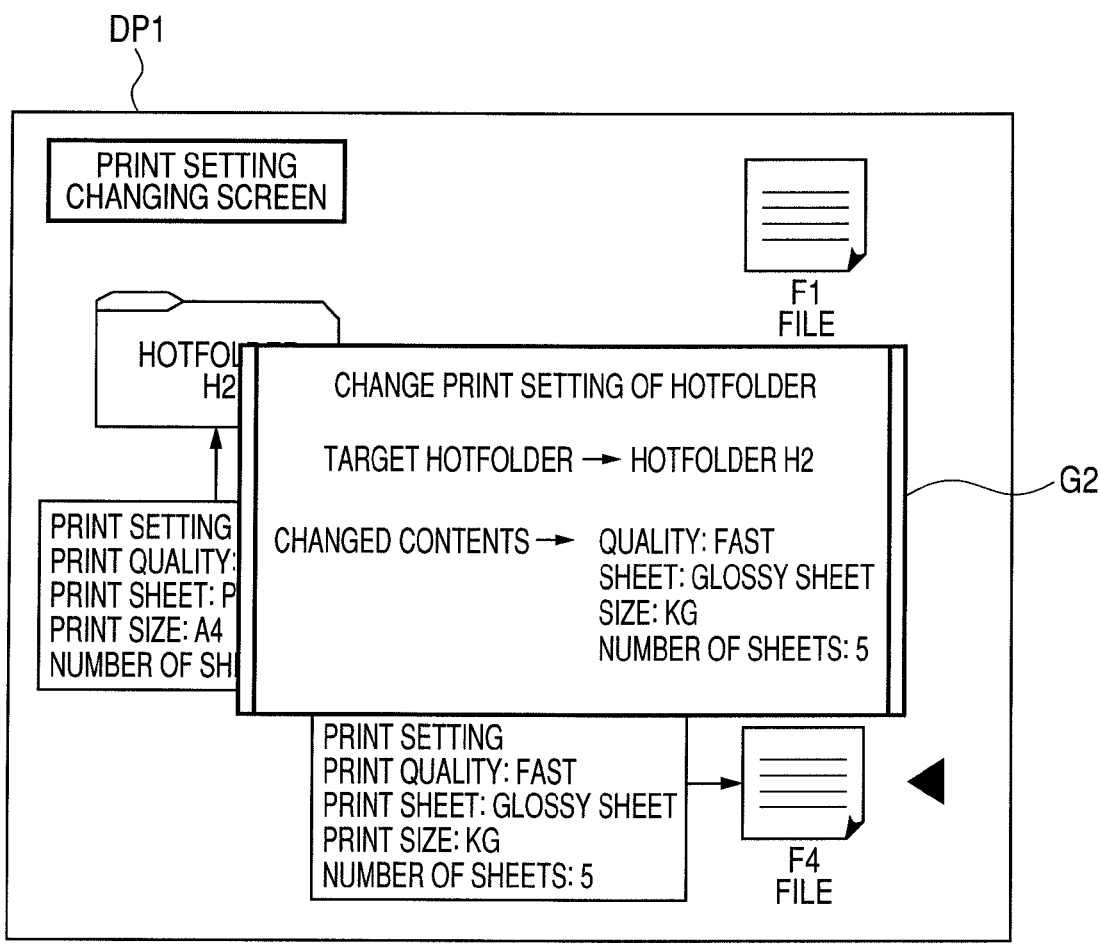
FIG. 6C illustrates a confirmation screen G2 which the CPU 43 displays on the display unit DP1 when the settings of a hot folder are changed.
Figure 6D:
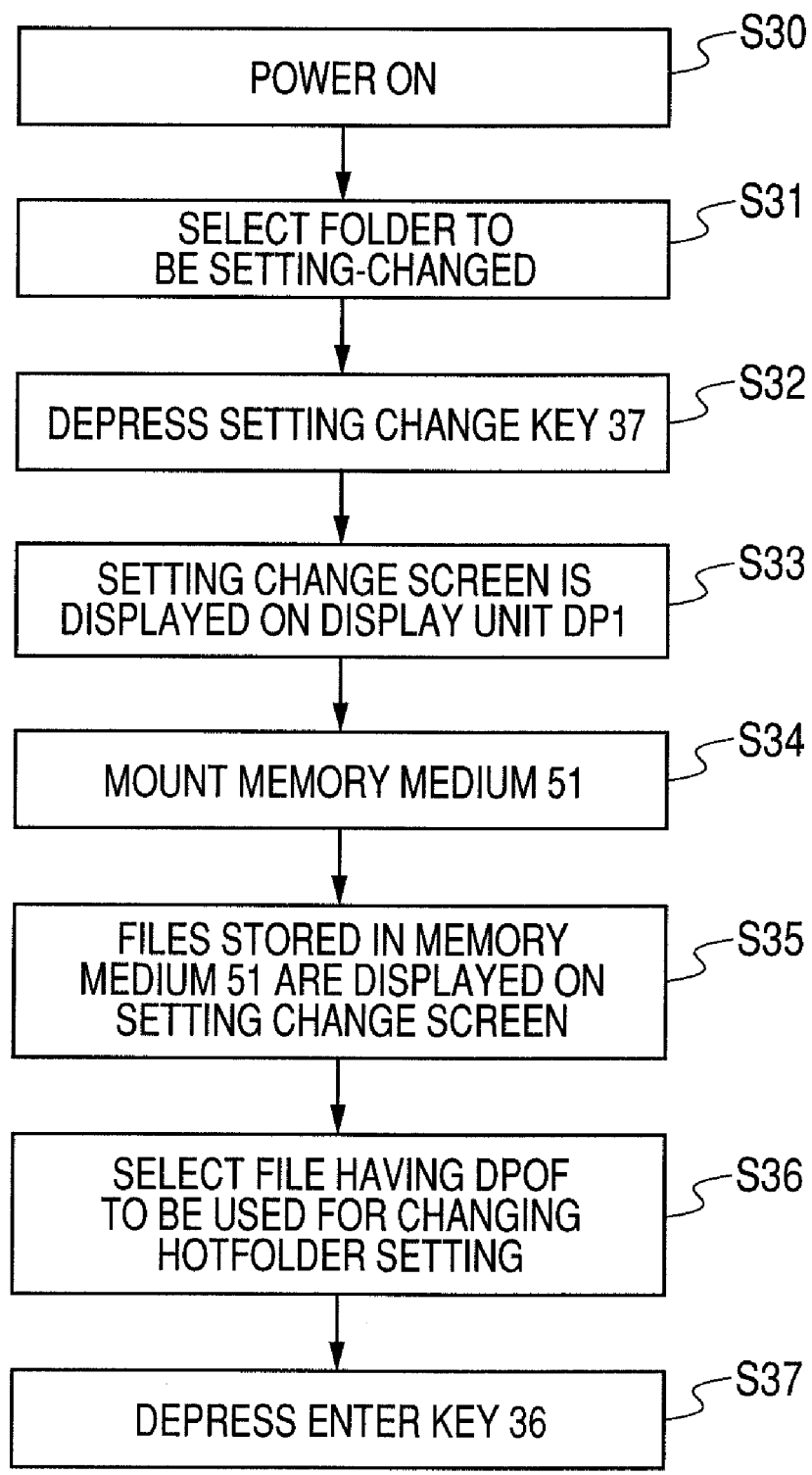
FIG. 6D is a flowchart illustrating an operation of overwriting the hot folder setting with a file having DPOF setting.

FIG. 6D is a flowchart illustrating the procedure of configuring the print settings of the hot folder by the use of a DPOF file.

First, the user operates the panel unit 30 to display a hot folder setting screen on the display unit DP1. This procedure will be described.

In a state where power is supplied to the image forming apparatus 100, the screen as illustrated in FIGS. 4A and 4B is normally displayed on the display unit DP1 (S30).

The user operates the folder select keys 34 and 35 provided to the panel unit 30 to select a hot folder that the user wishes to change the settings thereof from a list of hot folders displayed on the display unit DP1 (S31) The panel unit 30 contains means for issuing an instruction to transition to a hot folder setting screen. The setting change key 37 is means for issuing an instruction to transition to a hot folder setting screen.

When the user depresses the setting change key 37 (S32), the control unit 40 switches the screen by displaying only the folder selected from the list of hot folders displayed on the display unit DP1 (S33).

FIG. 6A illustrates a screen for displaying only a folder selected from the list of hot folders being displayed on the display unit DP1 to change the settings of the selected hot folder.

FIG. 6A illustrates the state where the setting change key is depressed when the folder select cursor C1 is placed on the hot folder H2. In FIG. 6A, the symbol SH2 indicates that the settings of the hot folder H2 are to be changed, and a table TH2 is a print setting table of the presently selected hot folder H2.

After confirming that the screen has transitioned to the hot folder setting screen, the user connects the memory medium 51 in which an image file having the DPOF settings is stored to the memory medium control unit 50 (S34). Alternatively, the screen may transition to the hot folder setting screen in a state where the memory medium is connected.

The memory medium control unit 50 recognizes the connected memory medium 51 and informs the control unit 40 of the memory medium. The control unit 40 creates a list of image files which have the DPOF settings and of which the settings of the hot folders can be changed, from the DPOF files stored in the memory medium 51, and stores the created list in the RAM 42.

In addition, the control unit 40 displays the symbols of the image files having the DPOF settings by referring to the list of image files stored in the RAM 42 (S35). At this time, the file select cursor C2 is also displayed, so that the DPOF setting information of the image file selected by the file select cursor C2 is displayed.

FIG. 6B illustrates an example of a screen for changing the settings of a hot folder.

In FIG. 6B, symbols SF1 to SF4 are symbols of files having the DPOF settings, stored in the memory medium 51. Moreover, symbol IF4 represents the DPOF setting information of file F4. The file select cursor C2 is a symbol of the cursor for selecting a file, and the file select cursor C2 can be moved by operating the file select keys 32 and 33 on the panel unit 30. The DPOF information of the file on which the file select cursor C2 is placed is displayed on the confirmation screen G2 illustrated in FIG. 6C.

The user searches for image files having the print settings set to the hot folder H2 by visually recognizing the DPOF information displayed on the confirmation screen G2 of the display unit DP1 (S36). When a desired file is found, the user selects the desired file via the Enter key 36 on the panel unit 30 (S37).

When the desired file is identified by the user, the CPU 43 reads the DPOF settings of the selected image file from the memory medium 51.

The CPU 43 searches for corresponding (or conforming) setting items from the setting items included in the print setting table of the selected hot folder and the setting items included in the read DPOF information. For the corresponding (or conforming) setting items which are found as the result of searching, the setting contents of the hot folder are overwritten with the setting contents of the DPOF information.

Information representing which setting item in the print setting table TH2 corresponds to which item of the DPOF setting information is stored in advance in the ROM 41.

FIG. 7 schematically illustrates the operation of overwriting the setting information of a hot folder.

Items (common items) that are provided in common between the setting items of the print setting table TH2 of the hot folder H2 and the setting items of the print setting table T11 of DPOF of file F4 are "print quality," "print sheet," "print size," and "number of print sheets."

For the setting item of the hot folder not included in the setting items of the DPOF, the CPU 43 reads default settings stored in the ROM 41 to be used as the complimentary settings of the hot folder. The default settings are prepared for each setting item. The default settings may be stored in the SRAM 44 so that they can be rewritten by users.

When the entire settings of the hot folder have been configured, the CPU 43 displays a completion confirmation screen on the display unit DP1 and completes the configuring operation.

FIG. 6C illustrates a confirmation screen G2 which the CPU 43 displays on the display unit DP1 when the entire settings of a hot folder have been configured.

When the settings of the hot folder are changed, it may be selected by a user whether the settings will be configured with the setting contents of the setting item of the DPOF or will be manually configured. Moreover, even when the settings are configured with the DPOF, users may be allowed to manually change settings on only a certain item (e.g., print size).

In this state, since the changed settings of the hot folder H2 are stored on only the RAM 42, the changed information may be deleted or lost when the image forming apparatus 100 is turned off. Therefore, when a user instructs to turn off the power, the print setting tables of hot folders stored on the SRAM 44 may be overwritten with the print setting tables of the hot folders stored in the RAM 42 so that the power of the image forming apparatus 100 may be turned off after the overwriting. By doing so, the loss of the changed information can be prevented.

In this way, the print settings of hot folders can be changed with settings of the DPOF file, and as a result, a print setting table TH2' corresponding to the hot folder H2 having the changed settings can be obtained.

That is, the image forming apparatus according to the above-described embodiment includes an associating unit that associates a file having settings on its own file with one of the specific folder. Moreover, the image forming apparatus according to the above-described embodiment includes a setting contents substituting unit that substitutes setting contents of the specific folder with setting contents of the own file.

Second Embodiment

DPOF information is information on print setting items that individual files can be provided with. Here, the "setting items" includes "print sheet size" (A4, B5, and the like) and "print quality" (fine, fast, and the like). When printing is executed on a file having this information, the print setting contents are automatically read from the DPOF and applied.

Therefore, users do not need to configure print settings of the file having the DPOF information whenever printing is performed.

However, when the file having the DPOF information is dropped on a hot folder, the settings to be applied to the file includes two settings, i.e. the settings of the DPOF and the settings of the hot folder; therefore, which print settings will be reflected is not clear.

According to a second embodiment of the present invention, which settings among the settings of the DPOF and the settings of the hot folder will take preference is set for each setting item.

First, an operation of changing a hot folder preferential mode where setting items set for a hot folder take preference to a DPOF preferential mode where setting items set in the DPOF information take preference will be described.

Figure 8A:
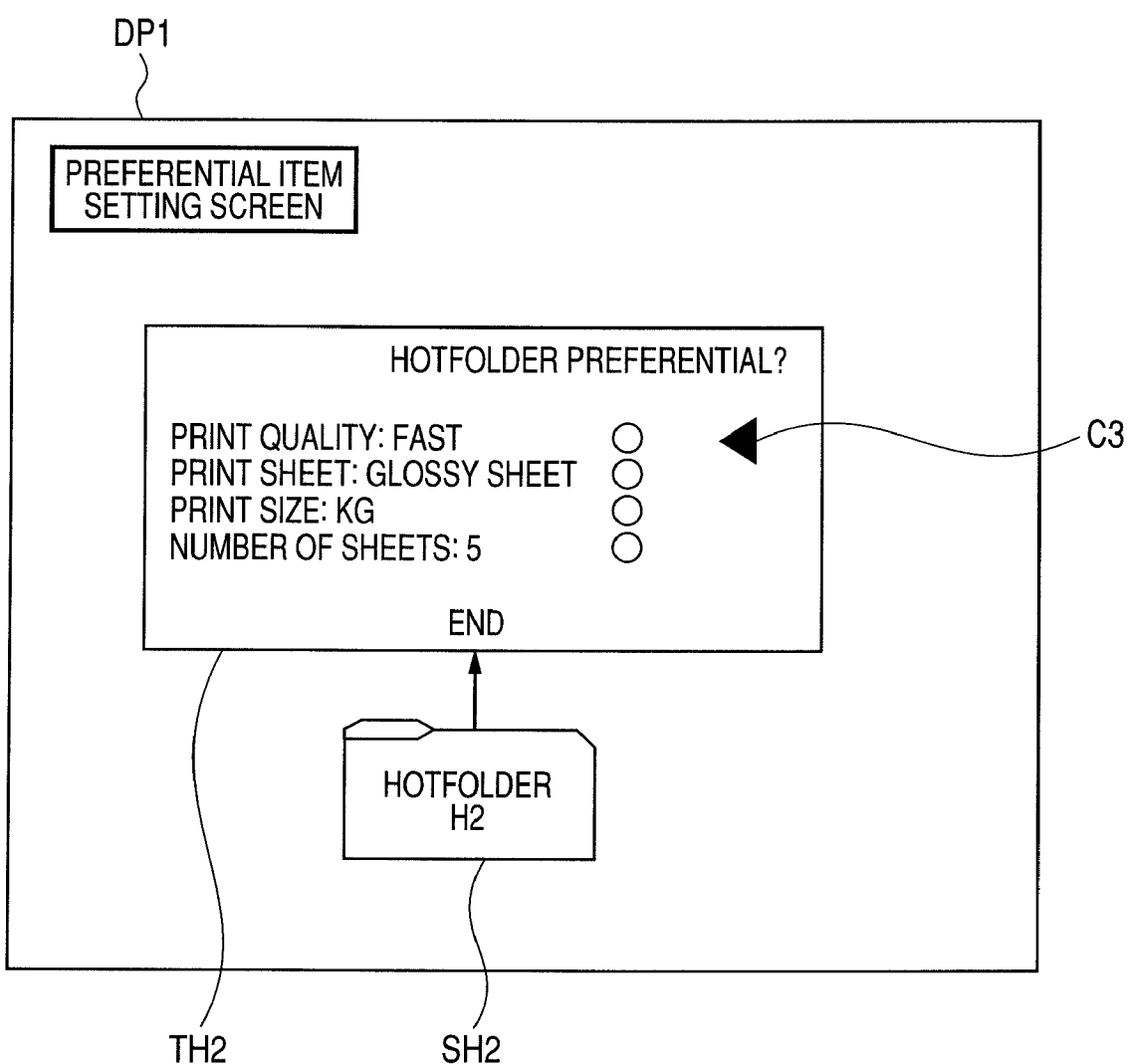
FIG. 8A illustrates a screen for changing a hot folder preferential mode where setting items set for a hot folder take preference to a DPOF preferential mode where setting items set in DPOF information take preference, according to a second embodiment of the present invention.

FIG. 8A illustrates a screen for changing a hot folder preferential mode where setting items set for a hot folder take preference to a DPOF preferential mode where setting items set in DPOF information take preference, according to a second embodiment of the present invention.

When the setting item is changed, the user change settings of the hot folder by using the DPOF information of a file, and the confirmation screen G2 illustrated in FIG. 6C is displayed on the screen, which then automatically transitions to the change screen illustrated in FIG. 8A.

In FIG. 8A, symbol SH2 is a symbol of a hot folder H2. The print setting table TH2 is a print setting table of the hot folder H2.

A preferential item select cursor C3 is a cursor which is displayed on the right side of a setting item to be selected as one of which the preference mode is changed from the hot folder preferential mode to the DPOF preferential mode.

The preferential item select cursor C3 can be moved by operating the folder select keys 34 and 35 on the panel unit 30 in a state when the change screen illustrated in FIG. 8A is displayed.

At this time, the user operates the folder select keys 34 and 35 so that the preferential item select cursor C3 is moved to an item of which the preference mode is desired to be changed and depresses the Enter key 36. In this way, the user can determine whether the setting item designated by the preferential item select cursor C3 will be set to the hot folder preferential mode or the DPOF preferential mode.

Figure 8B:
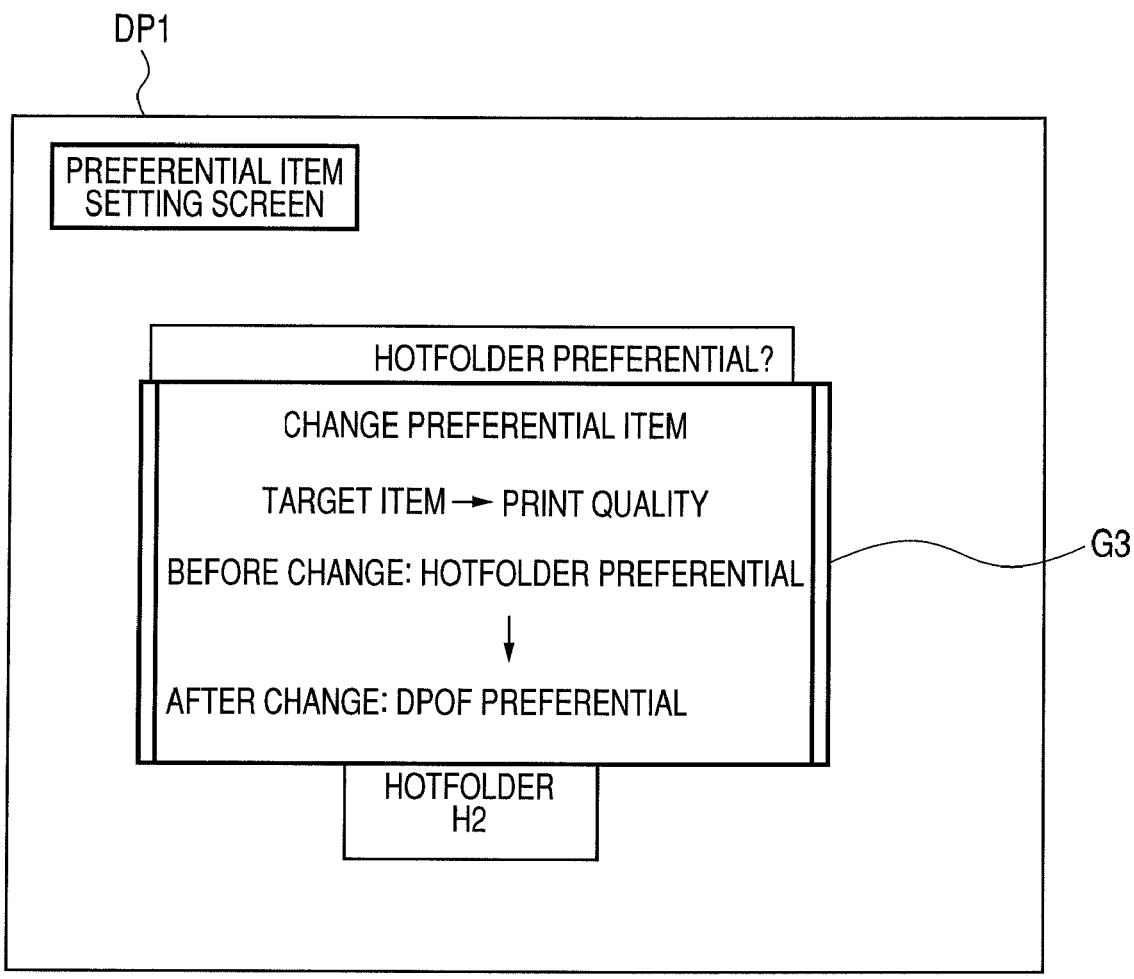
FIG. 8B illustrates a confirmation screen G3 for confirming whether a preferential mode for print quality is changed from a hot folder preferential mode to a DPOF preferential mode.

FIG. 8B illustrates a confirmation screen G3 for confirming whether a preferential mode for print quality is changed from a hot folder preferential mode to a DPOF preferential mode.

Figures 8C, 9:
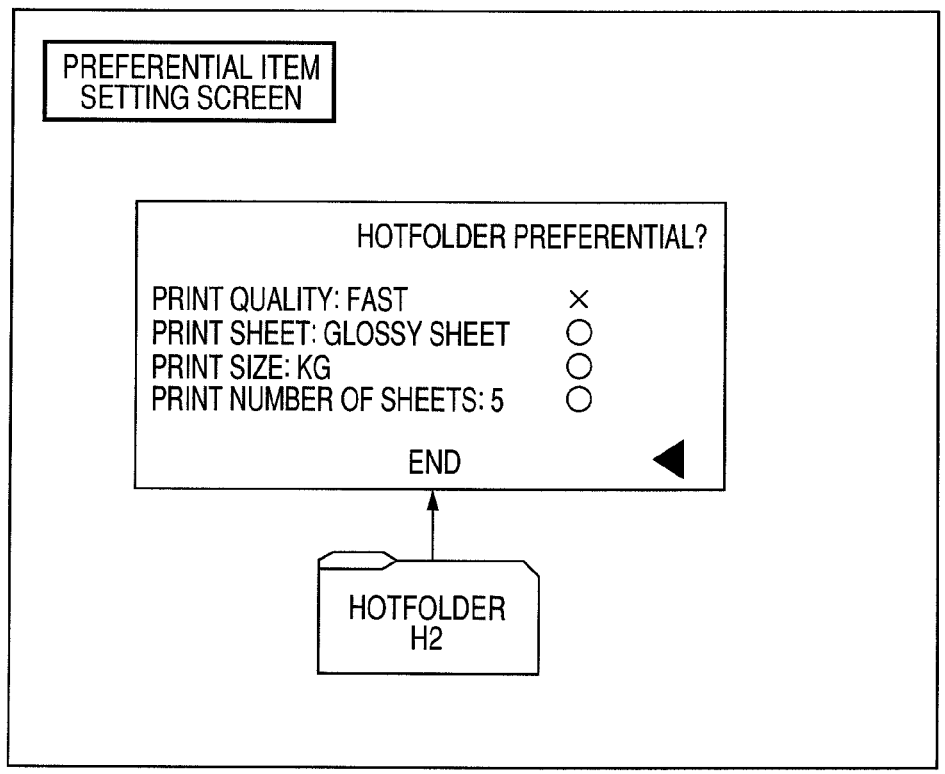
FIG. 8C illustrates a screen indicating that a preference mode has been changed to the DPOF preferential mode.
FIG. 9 illustrates a print setting table TH2 where a hot folder preferential mode is set according to the second embodiment.

FIG. 8C illustrates a screen indicating that the preference mode has been changed to the DPOF preferential mode.

When the preference mode has been changed to the DPOF preferential mode, the user moves the preferential item select cursor C3 to an icon of "Finish" and depresses an Enter key, thereby closing the screen.

FIG. 9 illustrates a print setting table TH2 where the hot folder preferential mode is set according to the second embodiment.

When the hot folder preferential mode is set, the print setting table of the set hot folder is changed and stored as illustrated in FIG. 9. A column for designating for each print item as to whether the print item will be set to the hot folder preferential mode is added.

Next, an operation of performing printing for the hot folder of which the preference mode is set to the hot folder preferential mode in the print setting table TH2 as illustrated in FIG. 9 will be described. Specifically, the operation when a file having the DPOF information is dropped for printing purposes onto the hot folder having settings as illustrated in FIG. 9 will be described.

The user operation is the same as that illustrated in the flowchart of FIG. 5A.

Figure 10:
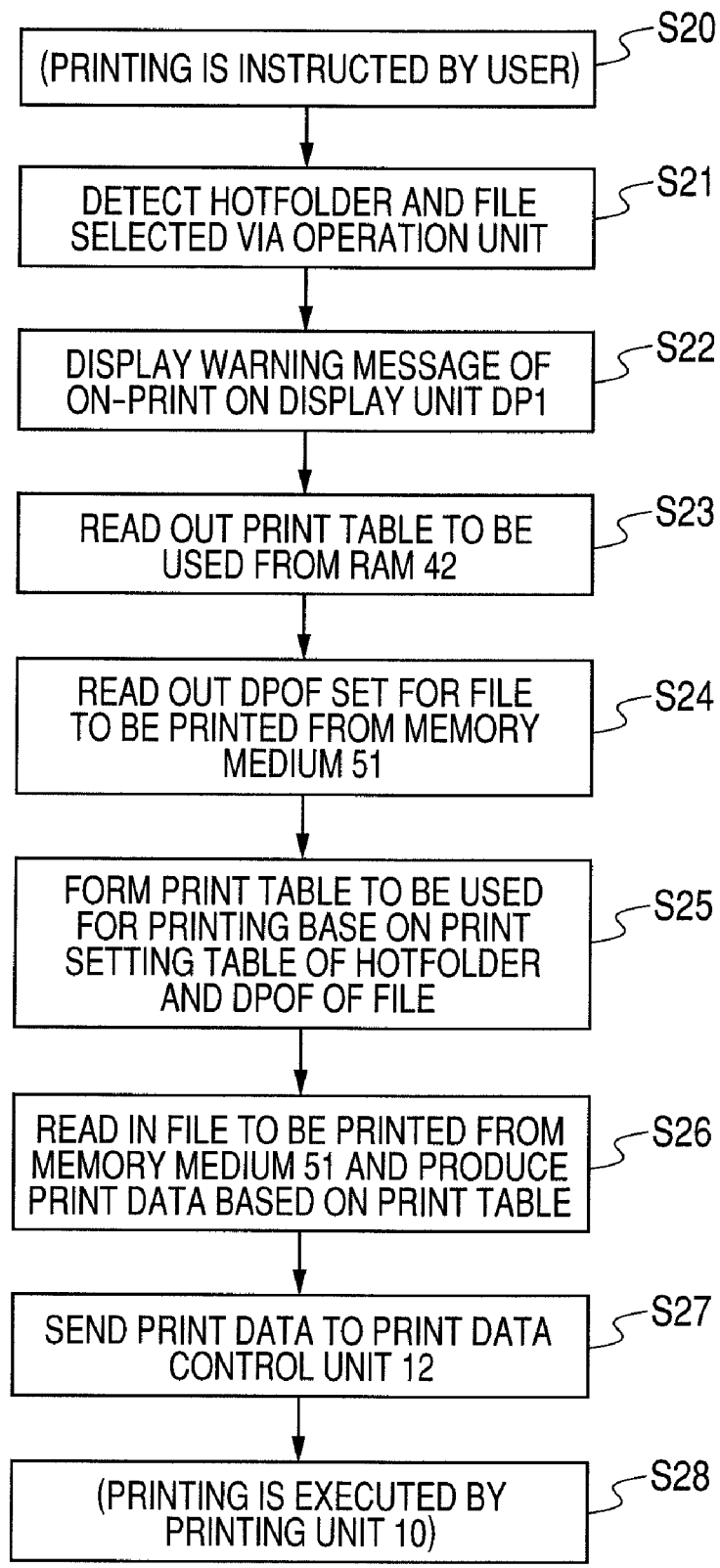
FIG. 10 is a flowchart illustrating the print operation (the operation of CPU 43) when a hot folder preferential mode is set according to the second embodiment.

FIG. 10 is a flowchart illustrating the print operation (the operation of CPU 43) when a hot folder preferential mode is set according to the second embodiment.

When the user depresses the Enter key 36 to instruct to start a printing operation (S20), the CPU 43 detects a hot folder and a file selected by the user from the status of the file select cursor C2 and the status of the folder select cursor C1 at that moment (S21). After the detection, the CPU 43 displays an on-print screen on the display unit DP1 (S22).

The CPU 43 reads out the print setting table of the hot folder stored in the RAM 42 (S23) and then, reads out the DPOF information of the file dropped onto the hot folder from the memory medium 51 (S24). Then, the CPU 43 creates a new print setting table on the RAM 42, in which the setting items set to the hot folder preferential mode are configured with the setting assigned to the hot folder and other setting items are replaced with the setting assigned to the DPOF information (S25).

FIG. 11 schematically illustrates a new print setting table TH2' produced from a print setting table TH2 assigned to a hot folder H2 according to the second embodiment and the print setting table TH2 based on the print settings of DPOF set to a file.

The designated image file is developed to print data based on the new print setting table TH2' created by the method illustrated in FIG. 11 (S26) and transmitted to the print data control unit (S27).

Then, the print drive control unit 11 determines an ink ejection position based on the print data stored in the print data control unit 12, and a print sheet conveying unit 13 conveys the print sheet based on the determined position. Then, the print drive control unit 11 drives a printing head 14 which is a component for ejecting ink. In this way, images are formed on the print sheet (S28).

When the file does not have the DPOF setting, the settings assigned to the hot folder are applied to the entire settings of the setting items.

By doing so, printing can be executed with only necessary items being reflected among the DPOF information of the file.

That is, the image forming apparatus according to the second embodiment includes an associating unit that associates a file having settings on its own file with one of the specific folder. The image forming apparatus according to the second embodiment also includes a setting reflecting unit. The setting reflecting unit is a unit that when setting items of the own file are the same as the setting items of the specific folders but the contents of the setting are different, determines the contents of the setting to be reflected in the operations. That is, the setting reflecting unit is a unit that determines the contents of the setting to be reflected in the operations for each setting item among the contents of the setting for the own file and the contents of the setting of the specific folder.

The image forming apparatus according to the second embodiment also includes an operation unit that, when the setting contents of the own file are reflected, performs operations with the setting contents for the own file being reflected therein and when the setting contents of the specific folder are reflected, performs operations with the setting contents of the specific folder being reflected therein.

Third Embodiment

Next, a third embodiment of the present invention will be described.

When performing printing based on the preference mode of hot folder preferential mode and DPOF preferential mode as in the second embodiment, there may be a case where it is difficult to recognize which settings are assigned to the hot folder and which settings are assigned to the DPOF.

Therefore, the display unit DP1 displays the settings set to the DPOF preferential mode on the symbols of the files and displays the settings set to the hot folder preferential mode on the symbols of the hot folders. By doing so, users can clearly know which setting item is set to the hot folder preferential mode or the DPOF preferential mode, and consequently, easily grasp the general print settings, thereby increasing the convenience.

Next, a specific display example according to the third embodiment will be described.

Figure 12:
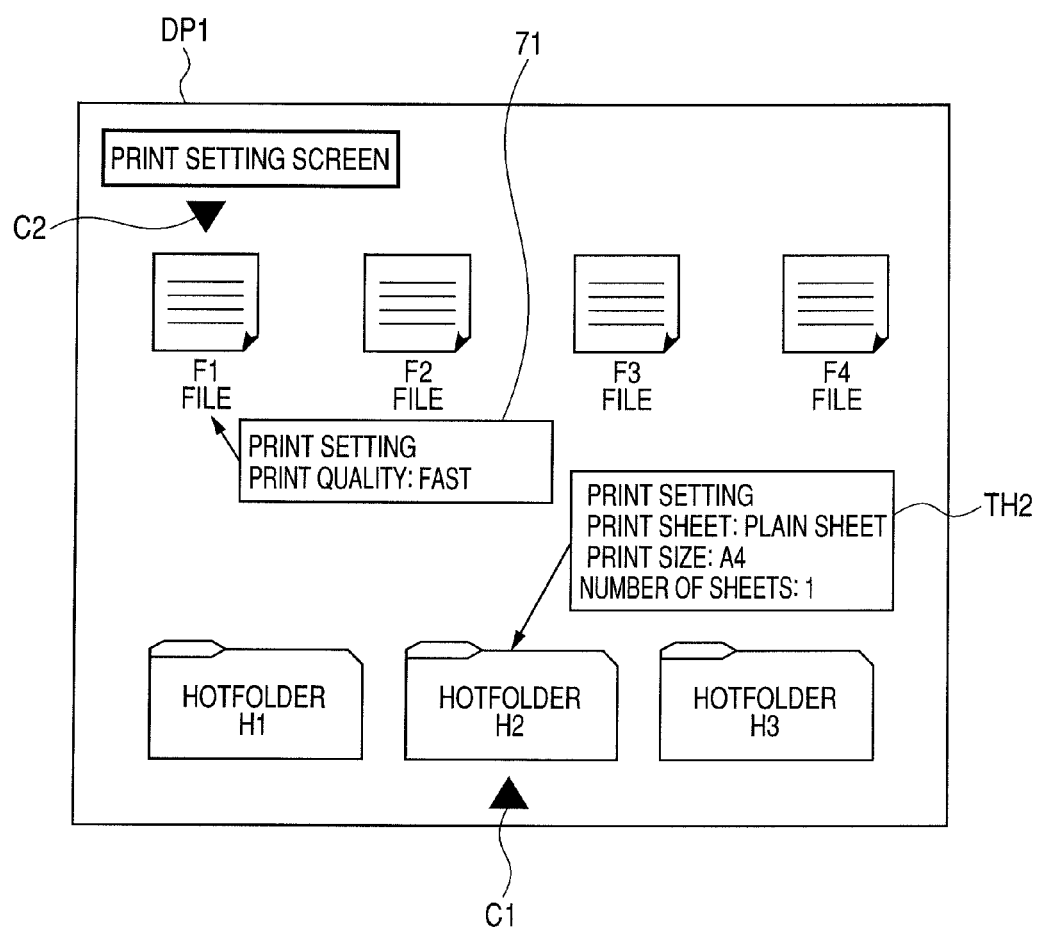
FIG. 12 illustrates a specific display example according to a third embodiment.

FIG. 12 illustrates a specific display example according to the third embodiment.

It is assumed that the memory medium 51 is connected to the memory medium control unit 50 and a list of image files stored in the memory medium 51 is displayed.

In the print setting table TH2, print items other than "print quality" are set to have a hot folder preferential mode. A hot folder of which the preference mode is set to a mode wherein the folder settings take preference or a mode wherein the DPOF settings take preference will be referred to as "hot folder having preferential item setting."

In the print setting table TH2, print items other than "print quality" are set to have a hot folder preferential mode. In this case, "density," "sheet feed port," "print sheet," "print size," and "magnification" will be referred to as "preferred item."

When the folder select cursor C1 is placed at the position of the hot folder H2 having preferential item setting, only the preferred items are displayed as illustrated in the print setting table TH2 of the hot folder H2.

Moreover, among the DPOF information of the file designated by the file select cursor C2, the setting item to be reflected in printing is displayed on the symbol of the file. In FIG. 12, among the DPOF information of the file F1, the item to be reflected in printing is displayed in a box indicated by 71. In this case, when the file and the folder are designated, the setting on "print quality" among the settings of the DPOF information of the file and the settings on "print sheet," "print size," and "number of print sheets" among the settings of the folder are reflected. The reflecting states can be easily confirmed by the users.

When the image forming apparatus 100 has a function of printing all files stored in the memory medium 51, the function of "displaying the preferential item" is implemented as follows.

By using the entire image print key 38 on the panel unit 30, users can print the entire images stored in the memory medium 51. A user operates the folder select keys 34 and 35 on the panel unit 30 to move the folder select cursor C1 to the position of the hot folder H2 and then depresses the entire image print key 38. Upon detecting such operations, the CPU 43 erases symbols other than that of the hot folder H2 from the display unit DP1. And, instead of this, the CPU 43 displays as many symbols of the files stored in the memory medium 51 as can be displayed. This state will be referred to as "entire file print screen."

Figure 13:
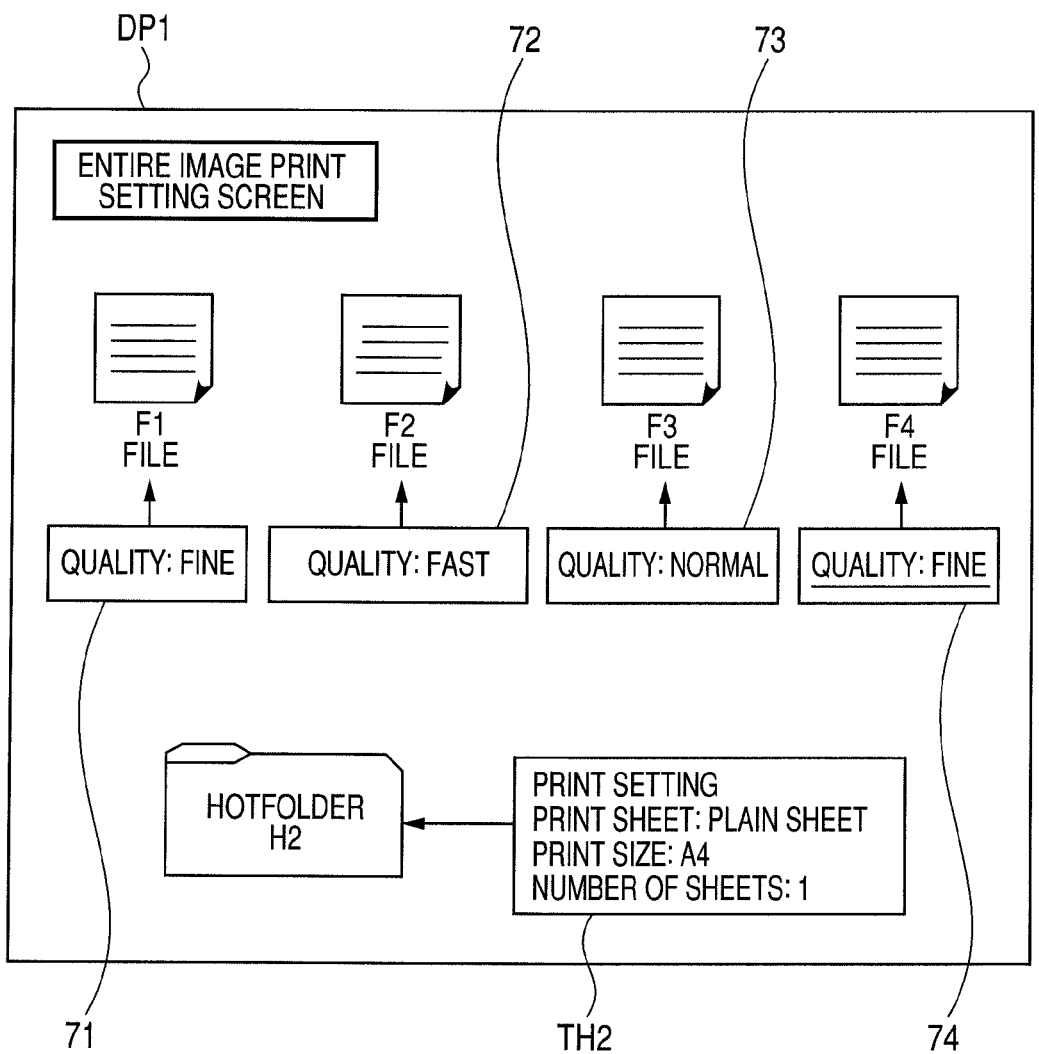
FIG. 13 illustrates a print standby screen for printing all images stored in the memory medium 51 when a preferential item is included in the print setting table, according to a third embodiment.

FIG. 13 illustrates a print standby screen for printing all images stored in the memory medium 51 if a preferential item is included in the print setting table, according to a third embodiment.

In the third embodiment, although the entire images are designated by a special key, files to be printed may be selected by using a device such as a mouse provided to the panel unit 30 to double-click on "entire image print" button provided on the display unit DP1.

On the entire image print screen, which of the print settings of the DPOF and the hot folder will take preference is displayed for each of the files F1 to F4. In the example illustrated in FIG. 13, items 71 to 74 to be reflected in printing among the DPOF information are the settings to be reflected in printing among the settings of the hot folder H2. Moreover, the items 71 to 74 to be reflected in printing are the settings to be reflected in printing among the DPOF information of the files.

When the user moves over the files using the file select key 32 and 33 on the panel unit 30, files which were unable to be displayed on one screen are sequentially displayed on the display unit DP1. By using such a displaying method, the users can recognize the settings of files and folders and the printing results at a glance.

In the example illustrated in FIG. 13, a plurality of picture image files is stored in the memory medium 51, and the user sets "print quality" among the settings of the DPOF information of the image files, to "fast," "fine," and "normal." Moreover, the print setting table TH2 illustrated in FIG. 9 is used as the settings of the hot folder H2.

When the memory medium 51 contains a file having no DPOF setting information, the print setting table is created based only on the settings set to the hot folder. In this case, the displayed setting is underlined, indicating that the setting is of the hot folder. In the example illustrated in FIG. 13, the file having no DPOF information is the file F4. That is, among the DPOF information of the file, the setting contents of which the characters of the setting item to be reflected in printing are underlined are the settings assigned to the hot folder. That is, the settings, "quality: fine," are the settings assigned to the hot folder.

When the user depresses the Enter key 36 after confirming the print settings of the respective files, printing is executed on the entire files stored in the memory medium 51.

That is, the image forming apparatus according to the above-described embodiment includes a displaying unit that displays schematic views of the specific folders or the files and the setting items. The image forming apparatus according to the above-described embodiment also includes an operation determining unit that, in a state where the file is designated to the specific folder and waiting for instructions for execution of operations thereon, determines operations to be executed on the designated file. That is, the operation determining unit determines operations to be executed on the designated file based on information representing the preference on setting items between the setting items of the designated file and the setting item set to the specific folder.

The image forming apparatus according to the above-described embodiment also includes a display control unit that displays the setting items, for which the setting of the specific folder take preference, in association with the specific folder and displays the setting items, for which the setting of the file take preference, in association with the file.

According to the above-described embodiment, even when some setting items have the same contents and some setting items have different setting contents for each file, the printing can be executed in a lump. Moreover, users can recognize which file is printed with which print settings before executing printing.

Although in the above-described embodiment, the entire image files are selected and printed, the embodiment may be applied to a case where the image forming apparatus 100 has a function of selecting some images, not the entire images, and printing the images.

The above-described embodiment is configured to print the entire files in the memory medium 51. However, the embodiment may be applied to a case where the image forming apparatus 100 is connected to another information device (such as a PC or an externally attached hard disc) and prints image files stored in the information device.

In this case, the image file may be selected from the image files stored in the connected information device by any method, and when printing is performed on the selected image files, the print settings of the image files may be displayed in the form illustrated in FIG. 13. When selecting the image files, image files belonging to the same folder in the information device may be selected. Moreover, the image files having the same creation date may be specified, and the image files may be specified by the connected information device.

According to the above-described embodiment, printing can be performed with the DPOF being reflected for arbitrary items. With this, the following convenience can be provided.

When it is desired to print the entire image files stored in the memory medium 51 with the same settings, users do not need to configure the entire image files to have the same settings, by means of reflecting the settings of the DPOF information in the settings assigned to the hot folder at the time of printing. Moreover, by substituting the settings of the hot folder with the settings of the DPOF information, the number of operations for configuring the hot folder can be reduced.

In the above-described embodiment, when a hot folder in which the print settings are already configured contains a file in which different print settings are assigned by the DPOF information, which settings will take preference is determined for each setting item. With this, users can configure detailed print settings even in automatic printing.

Moreover, in a state of waiting for a print command, the print setting items are displayed on the screen taking a preferential item into consideration. Therefore, users can recognize the setting items set to the hot folder, the setting items set to the file, and the printing results at a glance.

Although in the above-described embodiment, the file operation implemented by the hot folder was only printing, there may be hot folders having functions of e-mail, fax transmissions, etc. The embodiment can be applied to these hot folders.

That is, according to the above-described embodiments, since the settings of the hot folder are substituted with the settings of the DPOF information, users can have printing results with the same settings without performing the settings of the DPOF information for the entire files.

According to the above-described embodiments, by determining which of the setting items of the hot folder and the setting items of the DPOF information, the number of setting items of the DPOF information can be reduced to the minimum. Moreover, it is not necessary to prepare a plurality of hot folders having similar setting contents.

According to the above-described embodiments, since users can visually recognize, among the print settings of the image file, which setting item corresponds to the setting of the DPOF information or the setting of the hot folder before execution of printing, the management of setting items becomes easy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-120635, filed May 2, 2008, which is hereby incorporated by reference herein its entirety.

What is claimed is:

1. An image forming apparatus that associates specific folders, which are set for specific setting items, with a specific file, and performs operations on the specific file according to the settings of the specific folders, comprising:
   a processor and memory, cooperating to function as:
   an associating unit that associates a file having a setting on its own file with one of the specific folders;
   a setting reflecting unit that when setting items of the own file are the same as the setting items of the specific folders but the contents of the setting are different, determines the contents of the setting to be reflected in the operations for each setting item among the contents of the setting for the own file and the contents of the setting of the specific folder; and
   an operation unit that
   when the setting contents of the own file are reflected, performs operations with the setting contents for the own file being reflected therein, and
   when the setting contents of the specific folder are reflected, performs operations with the setting contents of the specific folder being reflected therein.

2. The image forming apparatus according to claim 1, said processor and memory cooperating to further function as:
   a displaying unit that displays schematic views of the specific folders or the files and the setting items;
   an operation determining unit that in a state where the file is designated to the specific folder and instructions for execution of the operations are waited, determines operations to be executed on the designated file based on information representing a preference on setting items between the setting items of the designated file and the setting item set to the specific folder; and
   a display control unit that displays the setting items, for which the setting of the specific folder takes preference, in association with the specific folder, and displays the setting items, for which the setting of the file takes preference, in association with the file.

3. A control method for an image forming apparatus that associates specific folders, which are set for specific setting items, with a specific file, and performs operations on the specific file according to the settings of the specific folders, the method comprising:
   an associating step of associating a file having a setting on its own file with one of the specific folders;
   a setting reflecting step of, when setting items of the own file are the same as the setting items of the specific folders but the contents of the setting are different, determining the contents of the setting to be reflected in the operations for each setting item among the contents of the setting for the own file and the contents of the setting of the specific folder; and
   an operation step of,
   when the setting contents of the own file are reflected, performs operations with the setting contents for the own file being reflected therein, and
   when the setting contents of the specific folder are reflected, performs operations with the setting contents of the specific folder being reflected therein.

* * * * *